Patented Nov. 5, 1940

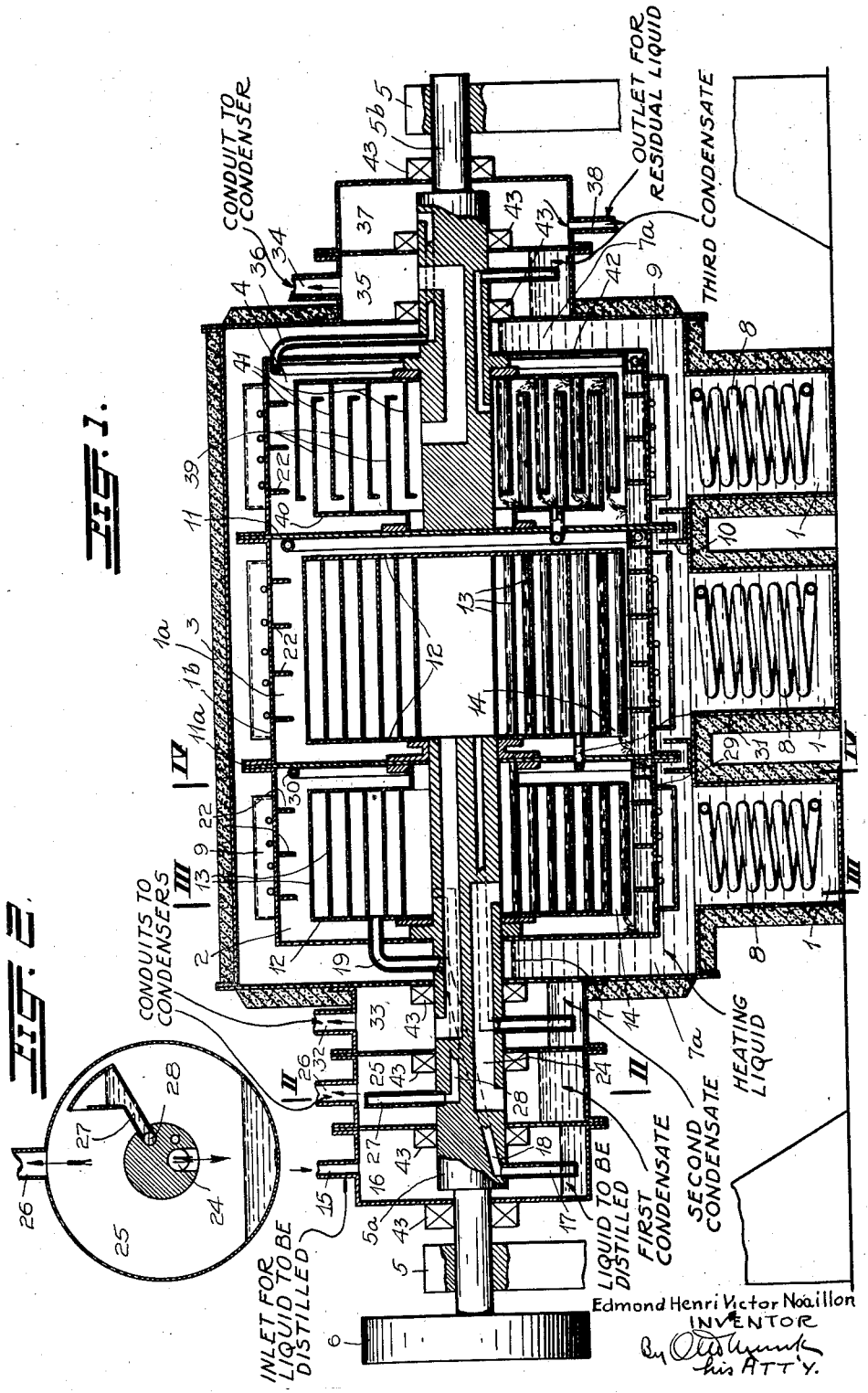

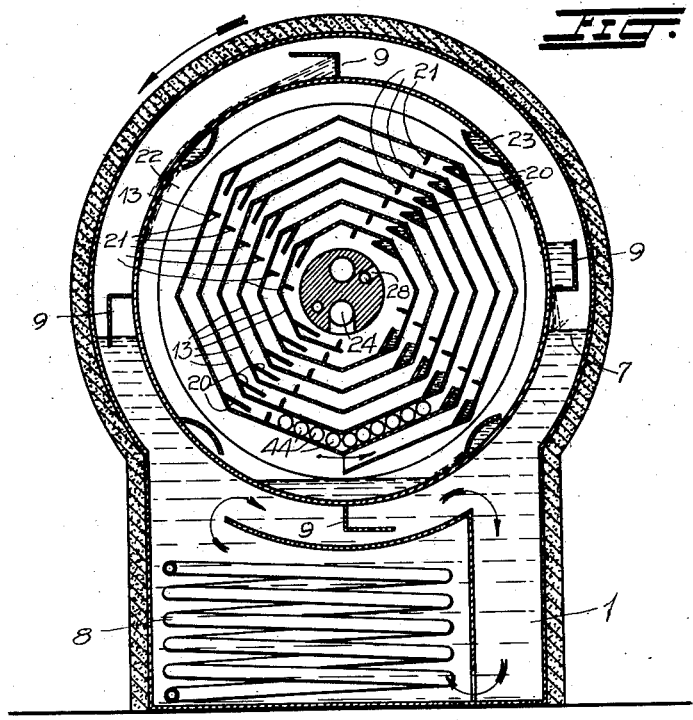
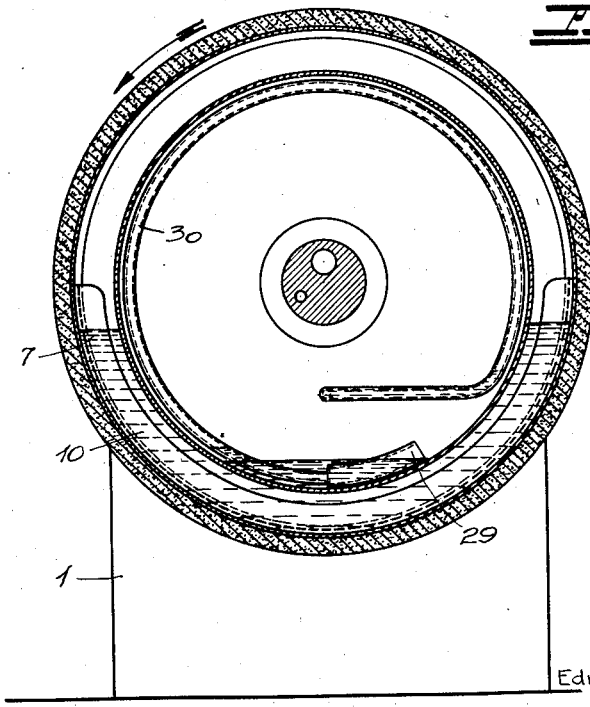

2,220,171

UNITED STATES PATENT OFFICE 2,220,171

APPARATUS FOR THE CONTINUOUS DISTILLATION OF LIQUIDS

Edmond Henri Victor Noaillon, Brussels, Belgium, assignor to Societe Generale de Fours a Coke, Systemes Lecocq, Societe Anonyme, Brussels, Belgium Application June 13, 1938, Serial No. 213,395
In Belgium June 21, 1937

14 Claims. (Cl. 202—238)

The rectification of liquids is based on the following principle:

The vapour released by a liquid is richer than the latter in one of its components. If the vapour of the liquid is washed with a part of the condensate obtained from its vapour a richer vapour is obtained. This richer vapour is again washed with a part of its condensate, and so on.

In present day processes for the continuous rectification of a liquid consisting of several components, a series of exhaustion columns is provided and on top of the same rectification columns are disposed. The vapours leaving the different rectification columns give, by condensation, the different components of the liquid in the pure state. The liquid flowing to the bottom of each exhaustion column is heated to the boiling point so as to send the vapours of one component into this column, whilst a part of this liquid is passed to the top of the following exhaustion column. This type of process has many disadvantages. These exhaustion columns require large dimensions and necessitate the use of relatively large amounts of reflux liquid.

According to the present invention these disadvantages may be overcome by introducing, at the bottom of such a column, vapours containing the component segregated in this particular column.

However, the construction according to the present invention produces many other advantages over the devices used heretofore as will become more apparent hereinafter.

The present invention effects the separation of a liquid into its different components by means of a cylindrical distilling chamber having a horizontal axis about which it rotates. The different distilling chambers are close together and form a single apparatus. Such distilling chamber being heated in a uniform manner on the whole of its cylindrical surface and each distilling chamber is fitted with a spiral "spreading receptacle" or "spreading cylinders" forming conduits, in which the liquid to be distilled is spread and trickles continuously over all the surfaces of the spiral or cylindrical walls, while moving from the centre of the spiral to the periphery; thence the liquid flows away onto the cylindrical wall of the distillation chamber, on which it is spread, and trickles on continuously, eventually reaching the boiling point. The vapours disengaged by this boiling circulate methodically through the spiral receptacle, or between the spreading cylinders, in a direction opposed to that of the liquid, and then through a central conduit, reach a fixed chamber whence they pass into a condenser. Thence, one part of the condensate is returned into the spiral receptacle, or onto the spreading cylinders, to act there as a reflux liquid.

The spreading receptacle, or the spreading cylinders, have the function of spreading the liquid to be distilled over a large surface and to cause this surface to be licked methodically by the vapours from the liquid.

One part of the spreading receptacle or cylinders serves as rectification column while another part acts as exhaustion column.

The liquid leaving the exhaustion column is discharged onto the cylindrical wall of the distillation chamber which is divided by annular ribs into a number of compartments. The liquid is vaporised partially in the first compartment and as a result the percentage of the most volatile component decreases. The liquid passes continuously from one compartment to the next by overflowing.

As a further result, the percentage of the most volatile component of the liquid in the successive compartments goes on decreasing.

In the final compartment, whence the residual liquid is discharged into the following distillation chamber, the liquid is entirely devoid of the most volatile component.

Figs. 1, 2, 3 and 4 illustrate by way of example one embodiment of the new device for carrying out the process above described, the same being intended for a liquid containing four components.

Fig. 1 is a vertical axial section of the apparatus.

Figs. 2, 3 and 4 are transverse sections looking towards the right taken on vertical planes II, III and IV.

The apparatus comprises a carefully lagged fixed housing or receptacle $1a$, having the shape of a horizontal cylinder provided at its lower part with three extensions $1$.

Inside the cylindrical part of the housing $1$ is disposed a concentric rotating cylinder $1b$ divided into three sections forming distilling chambers 2, 3 and 4.

Rotation is ensured by means of two shafts $5a$ and $5b$ aligned on the axis of the apparatus, and rotating in bearings 5. Shaft $5a$ carries a driving pulley 6.

The stationary housing $1a$ is filled up to the level 7 with a heating liquid $7a$ of very high boiling point which serves solely as a vehicle for the transmission of heat.

If desired, the fixed receptacle $1a$ may be filled totally with the heating liquid $7a$, but generally it is more convenient to fill it only up to the level of the fluid-tight packings in order to avoid leakage.

The heating liquid 7a is heated by the three steam coils 8 located in the extensions 1.

By reason of their rotation and of their immersion in the heating liquid 7a, the cylindrical walls of each distillation chamber will be maintained at a substantially constant temperature. In order to intensify the transmission of heat, the cylindrical walls of the distillation chambers 2, 3, 4 are provided exteriorly with buckets 9 the bottom of which is provided with apertures which discharge continuously the heating liquid 7a on to the walls of the rotating cylinder 1b.

The cylindrical walls of each of the three distillation chambers 2, 3 and 4 can thus be brought to a constant temperature at all the points of this wall and this temperature may be regulated separately for each chamber by regulating the admission of steam into the respective coils 8.

In order that the liquid 7a heating one chamber does not mix with the liquid 7a heating the adjacent chambers, the interior of the fixed housing 1a is provided two curved channels 10 projecting above the level of the liquid and forming with the assembly flanges 11a of the distilling chambers, joints which are sufficient to prevent any harmful displacement of the heating liquid.

Each distillation chamber 2, 3, 4 is separated from the adjacent chamber by walls 11.

Inside each of the distillation chambers 2 and 3, a spiral spreading receptacle is provided which consists of two side-walls 12 connected by a wall wound into a spiral in such a way as to provide a flattened spirally wound conduit 13. This spiral conduit 13 may be polygonal as shown in Fig. 3 or may follow a true spiral curve.

A large opening 14 is provided on the periphery of the left side-wall 12.

The liquid to be distilled enters the apparatus through the pipe 15 and falls to the bottom of the supply chamber 16. It is taken up by a connector 17 identical with the connector 27 of Fig. 2. This connector consists of a pipe at the end of which a box provided with an aperture is attached. The liquid penetrates into this box each time the connector plunges into the liquid at the bottom of the chamber 16.

The liquid passes then through a conduit 18 in the shaft and is delivered through a pipe 19 to a turn of the "spreading receptacle" (spiral conduit 13) of the chamber 2.

By reason of the rotation of the spiral conduit 13, the liquid which flows away in the lower part of the turn, drops one turn on each revolution of spiral conduit 13.

At spaced apart points on the interior wall of the spiral 13, soldered-on vanes 20 forming buckets (see Fig. 3) are provided which are filled once per revolution when plunging into the liquid which accumulates in the lower part of each turn of the spiral conduit 13. Vanes 20 then discharge this liquid on to the exterior surface of the spiral conduit 13 in such a way that the interior and exterior surfaces of all the spiral turns are continuously sprinkled.

These vanes 20 continuously raise a certain quantity of distilling liquid towards the center of the receptacle so that, even if the supply in liquid of the spreading receptacle ceased through the pipe 19, there would still be in each turn a certain quantity of liquid continuously taken up by the vanes.

In order to obtain an uniform composition of the liquid along the whole length of a generatrix of the spiral conduit 13, at the end of each turn, the following device may be employed: each vane 20 is preceded by a baffle 21 extending from one side-wall 12 of the spiral receptacle to a point short of the second side-wall 12 to form a passage. This passage exists for successive baffles alternately near the right and left side-walls, respectively.

The vane preceded by a baffle having a passage near the right side-wall 12, will fill up by taking on, during the lower part of the turn, the liquid located near the right side-wall 12, while the following vane will take on the liquid located near the left side-wall 12. An alternating movement of liquid from one side-wall 12, to the other is thus produced, which will mix the distilling liquid and render its composition uniform in each turn of the spiral 13.

The distilling liquid, after having been spread on the different turns of the spreading receptacle, flows away through the opening 14 and drops on to the cylindrical wall of the distilling chamber. By reason of the rotation of the distilling chamber, the whole cylindrical wall thereof is continuously moistened by the distilling liquid. The latter is therefore spread on a large heating surface and the heat, transmitted to the wall of the distilling chamber by the heating liquid 7a, produces boiling of the distilling liquid.

The cylindrical wall of each distilling chamber 2, 3, 4 is divided into a number of compartments by annular ribs 22.

In each distilling chamber 2, 3, 4 the distilling liquid is discharged into the first compartment on the left where it is partially vaporised, then it passes successively by flowing over the ribs 22 into the other compartments. During this travel, the liquid becomes more and more impoverished in its most volatile component in such a way that, on arriving in the last compartment, it no longer contains this most volatile component.

In order to accelerate the transmission of calories from the cylindrical wall of the distilling chamber to the distilling liquid, vanes 23 may be used which may be provided with apertures causing the liquid to trickle on to this wall.

The vapours which are released in the various compartments of the cylindrical wall of the chamber 2 e. g., enter the spreading receptacle through the opening 14 and traverse successively all the turns of the spiral conduit 13 and arrive finally at the centre of the receptacle. During their travel, these vapours are washed methodically by the distilling liquid which travels in the opposite direction.

The vapours escape from the centre of the spreading receptacle through the conduit 24 in the shaft 5a which discharges them into the tank 25 and thence through the pipe 26 towards a condenser from which one part of the condensate is returned as reflux liquid into the tank 25 (this liquid may be introduced into this tank by trickling along the interior wall of the pipe 26).

This reflux liquid is taken up by the revolving conveyor 27, led through the conduit 28 in the shaft 5a and delivered to the centre of the spiral conduit 13 of the distillation chamber 2. By reason of the rotation of spiral conduit 13, the liquid is advanced one turn on each revolution at the same time moistening the spiral wall 13 by reason of the vanes 20.

It will thus be seen that the central turns of the spiral 13, up to the one on which the pipe 19 discharges, fulfil the part of the rectifying column, whilst the following turns of spiral 13 fulfil the part of an exhaustion column.

As previously stated the residual distilling liquid contained in the last right hand compartment of the cylindrical wall of the distilling chamber 2 no longer includes the most volatile component.

This residual distilling liquid is then taken up by the rectangular mouth 29 of the pipe 30 (Fig. 4) which terminates at 31 (Fig. 1) during rotation of the spreading receptacle (spiral 13) of the distillation chamber 3. The pipe 30 is curved so as to embrace substantially the complete circumference of wall 11; thus it will contain liquid forming a hydraulic joint which always isolates the chamber 2 from the chamber 3. Any passage of vapour from the chamber 2 to the chamber 3 is thus avoided.

The operation of the distilling chambers 3 and 4 is the same as that of the chamber 2 above described.

The vapours of the second component of the mixture escape through the pipe 32 from the tank 33 and the vapours of the third component escape through the pipe 34 from the tank 35. In the end, the final residual liquid consisting of the fourth component is extracted by the pipe 36 and discharged into the tank 37 whence it flows away through the pipe 38.

The elements 43 represent schematically the fluid-tight packings between the rotating and the fixed parts.

It may be of advantage to provide for the supply of live steam to the distilling chamber 4 in order to effect, at a reduced temperature, the distillation of the liquid which it contains. To this end, the vapour may be introduced into the chamber 37 where it will expand. From there it will pass into the chamber 4 through a separate conduit in the shaft 56. Instead of fitting a distillation chamber with a "spiral spreading receptacle" (spiral conduit 13), it may be fitted with a series of concentric "spreading cylinders," as indicated for example for the chamber 4.

In the interior of distilling chamber 4 a series of spreading cylinders is disposed concentrically with the chamber axis, the uneven cylinders 41 being fixed to the side-wall 42 whilst the even cylinders 39 are fixed to the side-wall 40.

Each spreading cylinder 39, 40 carries at its free end a raised edge permitting the liquid to accumulate in the lower part of the cylinder.

In the interior of each spreading cylinder 39, 41 a series of vanes are provided which, during rotation, discharge on to the exterior wall of the preceding cylinder so that all the surfaces of all the cylinders 39, 41 are continuously sprinkled.

The vapours, released in the compartments formed by ribs 22 of the cylindrical wall of the distilling chamber 4, traverse successively all the annular spaces formed by the spreading cylinders 39, 41 whilst the distilling liquid moves in opposite direction while overflowing successively the upturned edges of the cylinders 39, 41.

The "spiral spreading receptacle" 13 has an advantage over the "spreading cylinders" in that it lengthens considerably the path of the vapours between these sprinkled surfaces. On the other hand the spreading cylinders may be made by casting, and may therefore be used to advantage when, in order to avoid chemical deteriorations, cast iron for example is to be employed.

In order that the surfaces of the turns of the "spiral receptacles" 13 or of the "spreading cylinders" 39, 41 retain the liquid, the same may be covered with a porous substance such as fabric for example.

In order to increase the surfaces of contact between the liquid and the vapour in the "spiral receptacles" 13 or in the "spreading cylinders", 39, 41 the free space between the turns or between the cylinders may be filled with packing elements providing an easy passage for the vapour and presenting large contact surfaces to the liquid.

For example, packing elements constituted by coil springs 44 of metallic wire (Fig. 3) each one having the length of the generatrix of the spiral surface or of the cylinders, and disposed parallel to this generatrix, may be disposed between the turns or between the cylinders.

In order that these coil springs may be fixed side by side without penetrating one another, it is advisable to use two types of coils having a different winding pitch and to arrange the coils alternately.

This kind of packing has the advantage of being homogeneous and of offering in all the points of the same section through which the vapour passes, an equal resistance to the passage of this vapour, thereby avoiding the formation of chimneys through which the vapours would preferentially escape.

The apparatus for the distillation and rectification of liquids forming the subject of the present invention has the following advantages over the construction known as "column plants".

1. The washing of the vapours by the liquids is effected in a methodical and regular manner with enormous contact surfaces.

2. There is no bubbling of vapours in the liquid and the velocity of the vapours is not sufficient to tear the film of liquid; there is therefore no entraining of liquid particles in the vapours.

3. The "spiral receptacles" or the "spreading cylinders," in which is effected the methodical washing of the vapours, are disposed in distillation chambers in which a constant temperature obtains.

4. The fixed housing containing the heating liquid has a relatively small exterior surface which is carefully lagged; heat losses by radiation are therefore small.

5. The quantity of distilling liquid contained in the apparatus is very small, which removes all risk of fire.

6. As soon as the apparatus ceases to rotate, all the heat exchanges become negligible; therefore, once the apparatus is stopped the heating liquid does not cool very much during the course of one night.

As moreover the distilling chambers contain only very small quantities of liquid, starting and stopping of the apparatus may be rapidly performed, and the device may be operated only during the day without inconvenience.

7. The apparatus does not require a great deal of space, especially as far as its height is concerned, and may be easily set up.

What I claim is:

1. A still comprising a housing, heating means associated therewith, a rotatable distilling chamber disposed in said housing and adapted to be heated by said heating means, said distilling chamber comprising conducting means for liquids and gases, said conducting means comprising concentrically arranged interconnected conduits, the latter being provided with a discharge opening, first conveying means connected to said conducting means at a predetermined point, the part of said conducting means between the said discharge opening and the point of connection of said first conveying means forming an exhaustion section, and second conveying means connected to said conducting means at a point spaced away from said discharge opening a greater distance than the point of connection of said first conveying means, the part of the conducting means located between the points of connection of the said first and second conveying means forming a rectification section, said first conveying means being adapted to introduce a distilling liquid into said exhaustion section and said second conveying means being adapted to introduce into said rectification section, a reflux liquid, the latter traversing said rectification section and the said exhaustion section, while the introduced distilling liquid traverses the said exhaustion section during rotation of the distilling chamber, vapors released by the heated liquids rising up through the said exhaustion section and said rectification section, flowing in opposite direction to the liquids travelling therethrough.

2. The device claimed in claim 1, in which the conduits of said conducting means are spirally disposed.

3. The device claimed in claim 1, in which the individual conduits of said conducting means are of polygonal shape.

4. The device claimed in claim 1, in which said conducting means consist of a plurality of concentrically disposed interconnected cylinders.

5. The device claimed in claim 1, comprising receiving means for receiving liquids discharged through said discharge opening, said receiving means being exposed to heat supplied by the said heating means.

6. The device claimed in claim 1, comprising a liquid in said housing in heat exchange relation with the said heating means and the said distilling chamber.

7. The device claimed in claim 1, comprising a liquid in said housing in heat exchange relation with the said heating means and the said distilling chamber, the latter being of cylindrical shape and said concentrically arranged conducting means being co-axially disposed with the said cylindrical chamber; an annular rib disposed on the inside wall of said distilling chamber, said rib forming a trough with the side wall of said chamber; said discharge opening being peripherally disposed on said conducting means and adapted to discharge liquids into the trough formed by said rib.

8. The device claimed in claim 1, comprising a liquid in said housing in heat exchange relation with the said heating means and the said distilling chamber, the latter being of cylindrical shape and said concentrically arranged conducting means being co-axially disposed with the said cylindrical chamber; a plurality of annular ribs disposed on the inside wall of said distilling chamber forming a series of compartments; the said discharge opening being peripherally disposed on said conducting means and adapted to discharge liquids into the first of said compartments, whereby, after filling of the first compartment, liquid enters into the second compartment by overflow and so on.

9. The device claimed in claim 1, comprising a liquid in said housing in heat exchange relation with the said heating means and the said distilling chamber, the latter being of cylindrical shape and said concentrically arranged conducting means being co-axially disposed with the said cylindrical chamber; a plurality of annular ribs disposed on the inside wall of said distilling chamber forming a series of compartments; the said discharge opening being peripherally disposed on said conducting means and adapted to discharge liquids into the first of said compartments, whereby, after filling of the first compartment, liquid enters into the second compartment by overflow and so on; further collecting means operatively connected with said rectification section for receiving the discharged vapors.

10. The device claimed in claim 1, comprising a liquid in said housing in heat exchange relation with the said heating means and the said distilling chamber, the latter being of cylindrical shape and said concentrically arranged conducting means being co-axially disposed with the said cylindrical chamber; an annular rib disposed on the inside wall of said distilling chamber, said rib forming a trough with the side wall of said chamber; said discharge opening being peripherally disposed on said conducting means and adapted to discharge liquids into the trough formed by said rib; the said conduits being provided with vanes facilitating mixture of liquids passing through said conduits and perforated vessels secured to the inside and outside walls of said distilling chamber, whereby, upon rotation thereof, liquid is first lifted by said vessels and then discharged to wet the walls thereof, both on the inside and the outside of said chamber.

11. The device claimed in claim 1, comprising a liquid in said housing in heat exchange relation with the said heating means and the said distilling chamber, the latter being of cylindrical shape and said concentrically arranged conducting means being co-axially disposed with the said cylindrical chamber; an annular rib disposed on the inside wall of said distilling chamber, said rib forming a trough with the side wall of said chamber; said discharge opening being peripherally disposed on said conducting means and adapted to discharge liquids into the trough formed by said rib; a shaft supporting the said rotary distilling chamber and said conducting means, said first and second conveying means include conduits extending through the said shaft.

12. A still comprising a housing, heating means associated therewith, a rotatable distilling chamber disposed in said housing and adapted to be heated by said heating means, said distilling chamber comprising conducting means for liquids and gases, said conducting means consisting of a plurality of units, each unit of said conducting means comprising concentrically arranged interconnected conduits, the latter being provided with a discharge opening; first conveying means connected to each unit of said conducting means at a predetermined point, the part of said conducting means between the said discharge opening and the point of connection of said first conveying means forming an exhaustion section, and second conveying means connected to each unit of said conducting means at a point spaced away from said discharge opening a greater distance than the point of connection of said first conveying means, the part of the conducting means located between the points of connection of the said first and second conveying means of each unit forming a rectification section, in each unit the said first conveying means being adapted to introduce a distilling liquid into said exhaustion section and the said second conveying means being adapted to introduce into said rectification section a reflux liquid; walls disposed in said distilling chamber between adjacent units of said conducting means to form separate compartments.

13. The device claimed in claim 12, in which said distilling chamber is provided with a plurality of extensions on the outside wall thereof at points corresponding to the said walls on the inside of the distilling chamber, cooperating elements provided on the inside of said housing for cooperation with the said extensions, the latter together with said cooperating elements forming separate compartments inside said housing, said heating means comprising a plurality of separate heating units, one heating unit being disposed in each of said compartments in said housing and a heating liquid disposed in each of said compartments of the housing in heat exchange relation with the respective heating units and said distilling chamber, whereby the temperature in each compartment of the housing may be separately controlled.

14. The device claimed in claim 12, in which said distilling chamber is provided with a plurality of extensions on the outside wall thereof at points corresponding to the said walls on the inside of the distilling chamber, cooperating elements provided on the inside of said housing for cooperation with the said extensions, the latter together with said cooperating elements forming separate compartments inside said housing, said heating means comprising a plurality of separate heating units, one heating unit being disposed in each of said compartments in said housing and a heating liquid disposed in each of said compartments of the housing in heat exchange relation with the respective heating units and said distilling chamber, whereby the temperature in each compartment of the housing may be separately controlled; the first conveying means of the first unit of said conducting means serving to supply fresh distilling liquid to the exhaustion section and said second conveying means of the first unit serving to supply a reflux liquid; and transferring means connected with the first conveying means of the second unit of said conducting means, said transferring means extending through the said wall extending between the said first and second units of said conducting means, said transferring means serving to transfer liquid discharged through the discharge opening of the first unit to the exhaustion section of the second unit, said transferring means including means preventing vapors from escaping from the compartment of the first unit to the second unit.

EDMOND HENRI VICTOR NOAILLON.